Patented Apr. 12, 1932

1,853,097

UNITED STATES PATENT OFFICE

YEIICHI TATSUMI, OF AZABU-KU, TOKYO, AND TAKISABURO IKEBE AND KOJIRO OKAZAKI, OF TOYOTAMA-GUN, TOKYO, JAPAN, ASSIGNORS TO MITSUI MINING CO., LTD., OF TOKYO, JAPAN

MANUFACTURE OF PURE ALUMINIUM OXIDE

No Drawing. Application filed November 13, 1928, Serial No. 319,182, and in Japan November 16, 1927.

Our invention relates to the manufacture of aluminium oxide of a high degree of purity, and has for its object to reduce the cost of manufacture of such compound in a highly purified state and provide a simple process of producing the same.

In order to prepare pure aluminium oxide, iron, iron oxide or magnetic pyrite in a relatively large quantity is mixed with aluminous materials such as clay, agalmatolite, diaspore, or bauxite, and the mixture is heated and fused in an electric furnace, whereby the silicic acid and the iron of these raw materials are separated and removed as ferro-silicon. To the reacting mixture are also added lime and large quantities of carbon, the impure aluminium oxide so obtained containing aluminium carbide and calcium carbide as impurities. The crude product is then suitably treated to separate and remove the carbon and calcium contained in the aluminium carbide, calcium carbide and lime.

The process aims at producing impure aluminium oxide first at a small expense with a minimum of electric power, and then purifying such oxide at a small cost, whereby aluminium oxide is produced in an easy and economical manner.

For the purpose of making aluminium oxide in an electric furnace from aluminous materials, such as clay, agalmatolite, diaspore and bauxite, a great amount of electric power is ordinarily required. Moreover the product is not made easily and the cost of pulverization is very great. It is very difficult to obtain aluminium oxide of more than 96% purity by any known purely electrical processes. For these reasons such processes have not been adopted hitherto for the manufacture of aluminium oxide.

According to the present invention, a practical and easily conducted process for obtaining pure aluminium oxide at a reduced cost is provided as follows:

Large quantities of iron, iron oxide or magnetic pyrite are added to the above mentioned aluminous materials, and at the same time large quantities of carbonaceous substances, such as coke or anthracite coal, and some lime are also added to them. The mixture is heated and fused in an electric furnace. (In case the raw materials contain enough calcium oxide, it is not necessary to add any lime.)

The silicic acid in the clay and the iron oxide are completely reduced to silicon and iron, respectively, by the carbonaceous substances, there being produced the easily fusible and separable ferro-silicon containing silicon in low degree because of the preponderating quantity of iron added to the original mixture. By the action of carbon, some quantities of the aluminium oxide and calcium oxide are reduced to aluminium carbide and lime carbide which float with aluminium oxide on the surface of the molten material in the furnace because of their low specific gravity, while the ferro-silicon settles to the bottom, so that the two layers may easily be separated. In this manner, aluminium oxide, which is almost entirely freed of the iron and silicon, can be prepared. The melting point of this impure aluminium oxide is far lower than that of aluminium oxide as heretofore prepared in an electric furnace, and may easily be attained in the furnace. Consequently the quantity of electric power consumption, the most important item of cost in the preparation of aluminium oxide, may considerably be lessened. The crude aluminium oxide which is taken out of the furnace and cooled contains calcium compounds and aluminium carbide, and is very rough, when compared with aluminium oxide such as prepared heretofore in an electric furnace, and it may be easily pulverized in a suitable machine. The powdered impure aluminium oxide may then be treated either with hydrochloric acid or at first with steam and then with hydrochloric acid, to separate and remove the aluminium carbide, lime carbide and calcium oxide to produce pure aluminium oxide.

The reactions in this case are as follows:

$$CaO + 2HCl = CaCl_2 + H_2O$$
$$CaC_2 + 2H_2O = C_2H_2 + Ca(OH)_2$$
$$Ca(OH)_2 + 2HCl = CaCl_2 + 2H_2O$$
$$Al_4C_3 + 12H_2O = 3CH_4 + 2Al_2(OH)_6$$

The following is an illustration of a practical mode of carrying out our invention, but the same is to be understood as being given by way of example and not by way of limitation:

The percentage composition of the clay used is as follows:

| | |
|---|---|
| Alumina | 36.12 |
| Silica | 49.20 |
| Iron oxide | 3.36 |
| Lime | 0.22 |

To make up the reacting mixture, the following proportions (by weight) may be used:

| | |
|---|---|
| Clay | 100 parts |
| Iron | 35 parts |
| Coke | 50 parts |
| Lime | 1 part |

After these ingredients have been mixed together, the mixture is charged into an electric furnace operating at about (1,500 kilowatts) to melt it. Impure aluminium oxide is thus produced and is very rough and may easily be pulverized. Its composition is as follows:

| | Per cent |
|---|---|
| Alumina | 93.00 |
| Silica | 0.20 |
| Lime | 3.74 |
| Iron | 0.01 |
| Total carbon | 2.30 |

The following is the composition of aluminium oxide refined by pulverizing this impure aluminium oxide to a fine powder of less than 100 meshes per inch, and by treating it with hydrochloric acid at 10 degrees Bé.:—

| | Per cent |
|---|---|
| Alumina | 99.20 |
| Silica | 0.20 |
| Lime | 0.30 |
| Iron | 0.01 |
| Total carbon | 0.10 |

In short, the present invention, as above explained, facilitates the extraction of aluminium oxide, which was hitherto difficult to do in an electric furnace, and reduces the consumption of electric power. Moreover it overcomes the difficulty usually encountered in pulverizing aluminium oxide as hitherto prepared in an electric furnace. According to our process, aluminium oxide of more than 99% purity can be produced by a subsequent simple wet treatment, and we thus obtain economically and easily materials for preparing white alundum or metallic aluminium. In addition, by treating the powdered impure aluminium oxide with water, aluminium carbide and calcium carbide can be decomposed to aluminium hydroxide and calcium hydroxide, so that the purity of aluminium oxide can be increased and the oxide rendered suitable as raw material for preparing metallic aluminium.

Where in the claims we employ the term "iron-containing material", the same is to be understood to include not only iron oxides or ores, but also the metal itself.

Having now particularly described and ascertained the nature of our said invention and in what manner the same is to be performed, we declare that what we claim is:

1. The method of producing substantially pure aluminium oxide, which comprises the steps of heating and fusing a mixture of silicious aluminium-containing material, an iron-containing material and a carbon-containing material in an electrical furnace, thus producing an impure aluminium oxide, separating said impure aluminium oxide from the ferro-silicon resulting from the conversion of silicon, and then removing the carbon and the calcium from the impure aluminium oxide.

2. The method of producing substantially pure aluminium oxide, which comprises the steps of heating and fusing a mixture of silicious aluminium-containing materal, an iron-containing material, a carbon-containing material and lime in an electrical furnace, thus producing an impure aluminium oxide, separating said impure aluminium oxide from the ferro-silicon resulting from the conversion of silicon, and then removing the carbon and calcium from the impure aluminium oxide.

3. The method of producing substantially pure aluminium oxide, which comprises the steps of heating and fusing a mixture of silicious aluminium-containing material, iron, a carbon-containing material and lime in an electrical furnace, thus producing an impure aluminium oxide, separating said impure aluminium oxide from the ferro-silicon resulting from the conversion of silicon, and then removing the carbon and calcium from the impure aluminium oxide.

4. The method of producing substantially pure aluminium oxide, which comprises the steps of heating and fusing a mixture of silicious aluminium-containing material, iron oxide, a carbon-containing material and lime in an electrical furnace, thus producing an impure aluminium oxide, separating said impure aluminium oxide from the ferro-silicon resulting from the conversion of silicon, and then removing the carbon and calcium from the impure aluminium oxide.

5. The method of producing substantially pure aluminium oxide, which comprises the steps of heating and fusing a mixture of silicious aluminium-containing material, iron, iron oxide, a carbon-containing material and lime in an electrical furnace, thus producing an impure aluminium oxide, separating said impure aluminium oxide from the ferro-silicon resulting from the conversion of silicon, and then removing the carbon and calcium from the impure aluminium oxide.

In testimony whereof we hereunto affix our signatures.

YEIICHI TATSUMI.
TAKISABURO IKEBE.
KOJIRO OKAZAKI.